US005566287A

United States Patent [19]

Delpuch

[11] Patent Number: 5,566,287

[45] Date of Patent: Oct. 15, 1996

[54] METHOD FOR ASYNCHRONOUSLY MAINTAINING AN IMAGE ON A DISPLAY DEVICE

[75] Inventor: Alain Delpuch, Los Angeles, Calif.

[73] Assignee: Thomson Consumer Electronics, Inc., Indianapolis, Ind.

[21] Appl. No.: 267,084

[22] Filed: Jun. 28, 1994

[51] Int. Cl.[6] ...................... G06F 15/00

[52] U.S. Cl. ...................... 395/133

[58] Field of Search ...................... 395/135, 155, 395/160, 161, 133; 345/115, 116, 117, 118

[56] References Cited

U.S. PATENT DOCUMENTS

| | | | |
|---|---|---|---|
| 5,297,252 | 3/1994 | Becker | 395/160 |
| 5,343,238 | 8/1994 | Lappington et al. | 348/12 |
| 5,430,870 | 7/1995 | Stanton et al. | 395/600 |
| 5,438,661 | 8/1995 | Ogawa | 395/157 |

FOREIGN PATENT DOCUMENTS

| | | |
|---|---|---|
| 0413484 | 2/1991 | European Pat. Off. . |

OTHER PUBLICATIONS

"*HP IVI Application Program Interface Design*", by Pamela W. Munsch, Warren I. Otsuka and Gary D. Thomsen, published in Hewlett-Packard Journal, Oct. 1990, pp. 21–31.

*Primary Examiner*—Phu K. Nguyen

*Attorney, Agent, or Firm*—Joseph S. Tripoli; Eric P. Herrmann; Ronald H. Kurdyla

[57] ABSTRACT

A method for asynchronously maintaining an image on a display device comprises the following steps. First, a drawing request is received from the application program. Then a drawing area of the image is determined in response to the received drawing request and an entry representing the drawing area is inserted into a list of entries representing respective drawing areas. A screen update request is then received from the application program. In response to this received screen update request, an entry representing a drawing area is retrieved from the list, and graphic objects are redrawn if any portion of the graphic object lies within the drawing area represented by the retrieved entry.

16 Claims, 5 Drawing Sheets

METHOD FOR ASYNCHRONOUSLY MAINTAINING AN IMAGE ON A DISPLAY DEVICE

The present invention relates to a system for managing the interface between an executing computer program and a user. In particular, such a system supplies data to the user via an image made up of graphic objects drawn on a display screen. The image is maintained asynchronously from any display update requests made by the computer program.

In the following discussion, an object oriented paradigm is used in which each graphic element to be displayed on a display device is represented by a programming object, which may in turn contain other objects. Each such graphic object has attributes, and has methods for manipulating that object which are invoked in response to messages sent to that object. For example, attributes of a graphic object include its position on the screen, its size and its color. Some graphic objects have attributes which are unique to that class of object. For example, a circle object has a radius attribute, and a text object has a string attribute.

These attributes have values which may be changed by the application program. For example, the color attribute of an object may be assigned a value of "blue" or "red"; the position attribute may be changed to move the object to a different location on the display screen; and/or the size attribute may be changed to resize that object on the display screen. When an attribute of a graphic object is changed, a display manager is invoked to redraw that object, and possibly other objects surrounding that object, to incorporate the changed attribute. For example, if the color of an object is changed by the application program, that object is redrawn having the new color. As another example, if an object is moved, the original location is redrawn without the object, and the new location is redrawn with the object. One skilled in the art of object oriented system programming will understand these concepts and will be able to design and implement systems using graphical objects.

It is well known that in graphical-based processor systems, the processor spends the majority of its processing time performing graphical functions, e.g. drawing or redrawing graphic objects on the display screen, and that it is important to optimize the screen drawing speed. In order to maximize graphical response times, current object-oriented graphical-based processor systems automatically invoke the display manager to redraw the screen immediately after any change in an attribute of a graphical object. The inventor has realized, however, that at any given time in the execution of an interactive program, other processing functions may be more important in increasing the perceived response speed than the screen drawing function, e.g. responding to user inputs, or data received from mass storage device or a remote transmission location.

The present invention may be embodied in an audio video interactive (AVI) system. An AVI system is a proposed broadcast system allowing users to interact with broadcast AVI programs. In such a system, an AVI signal from a transmission location is broadcast to remote AVI receivers. The AVI signal includes an audio and a video component, as in a standard television signal, and also an interactive program component. The interactive program component continuously repeats data representing the code and data modules making up the application program. Each AVI receiver includes a processor which extracts code and data modules from the transmitted interactive component as needed, and, under the control of the extracted application program, generates graphics and sounds which may be overlaid on the audio and video components and responds to user input in an interactive manner.

It is important that an AVI receiver cost as little as possible in order to maximize the distribution of such receivers among consumers. This constraint points to the use of low-cost, but relatively slow processors in the AVI receiver. However, it is also important that the perceived response speed of an interactive program be as fast as possible. A method of increasing the perceived response speed of an interactive program to user inputs, while retaining the ability to use low-cost, relatively slow processors is desirable.

In accordance with principles of the present invention, a method for asynchronously maintaining an image on a display device comprises the following steps. First, a drawing request is received from the application program. Then a drawing area of the image is determined in response to the received drawing request and the drawing area is inserted into a list of drawing areas. A screen update request is then received from the application program. In response to this received screen update request, a drawing area is retrieved from the list, and all graphic objects are redrawn if any portion of the graphic-object lies within the retrieved drawing area.

Figure 5A:
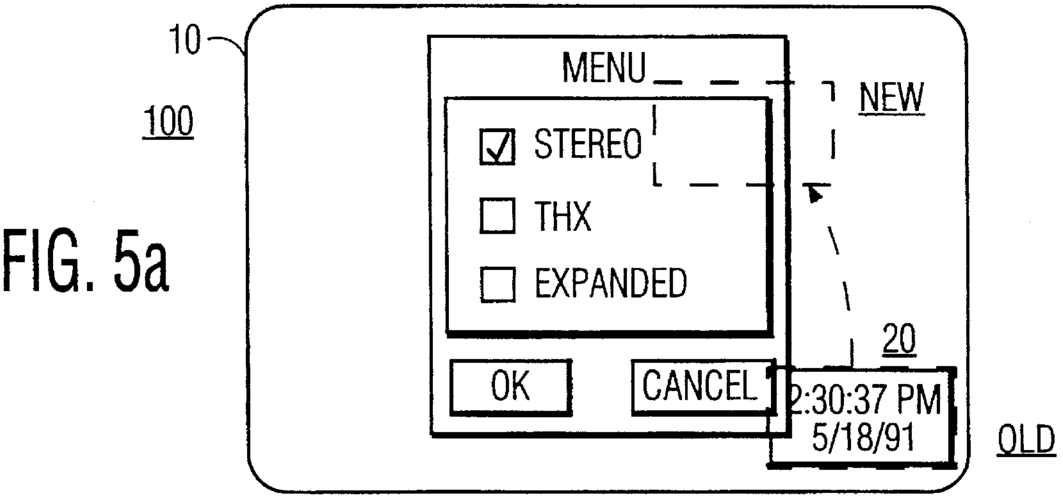
Figure 5B:
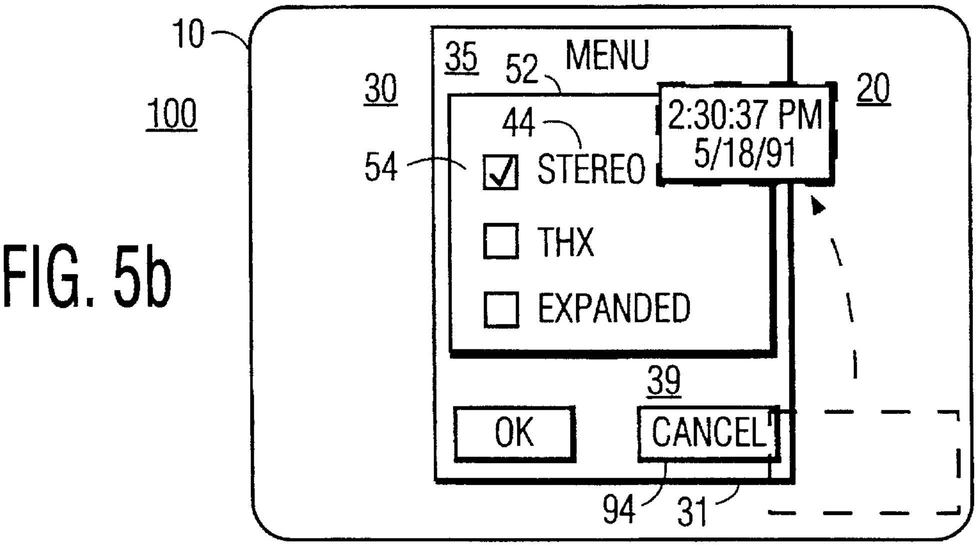
Figure 5C:
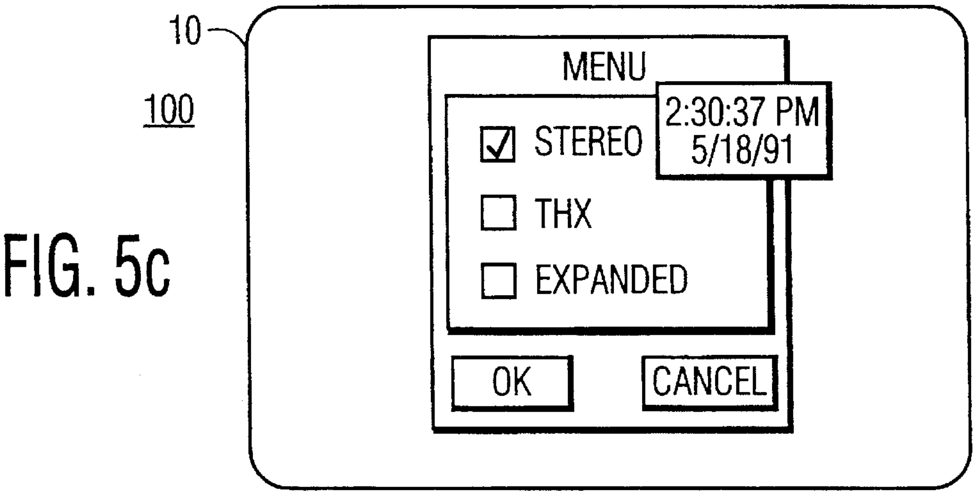
Figure 6:
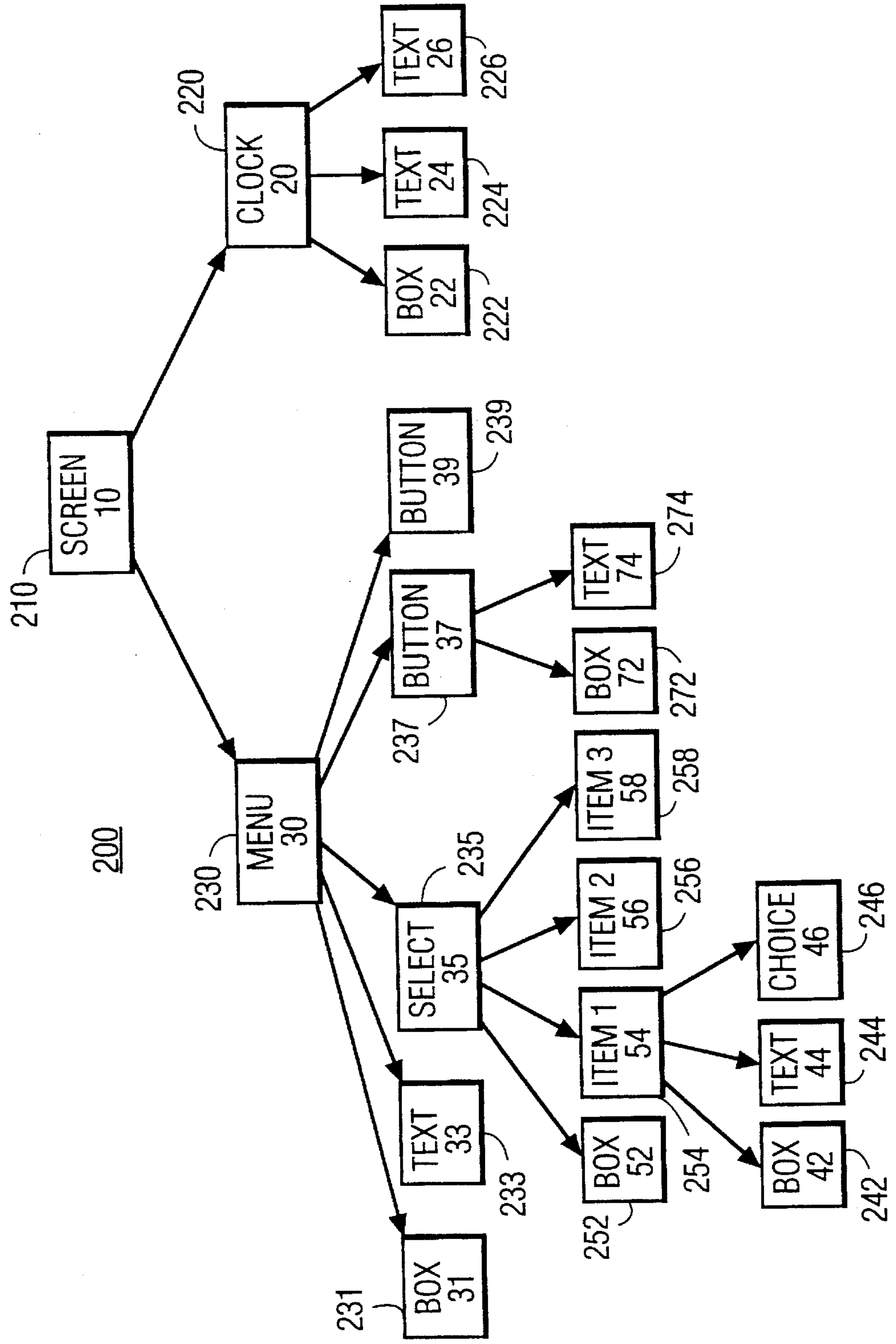

FIG. 4(*a*)–4(*c*) are a diagram illustrating respective arrangements for optimizing the list of drawing areas;

FIG. 5(*a*)–5(*c*) a diagram illustrating a sequence of screen displays on the display device resulting from moving a graphic object from one location to another according to the present invention; and FIG. 6 is a tree diagram corresponding to the display illustrated in FIG. 5*c*.

Figure 1:
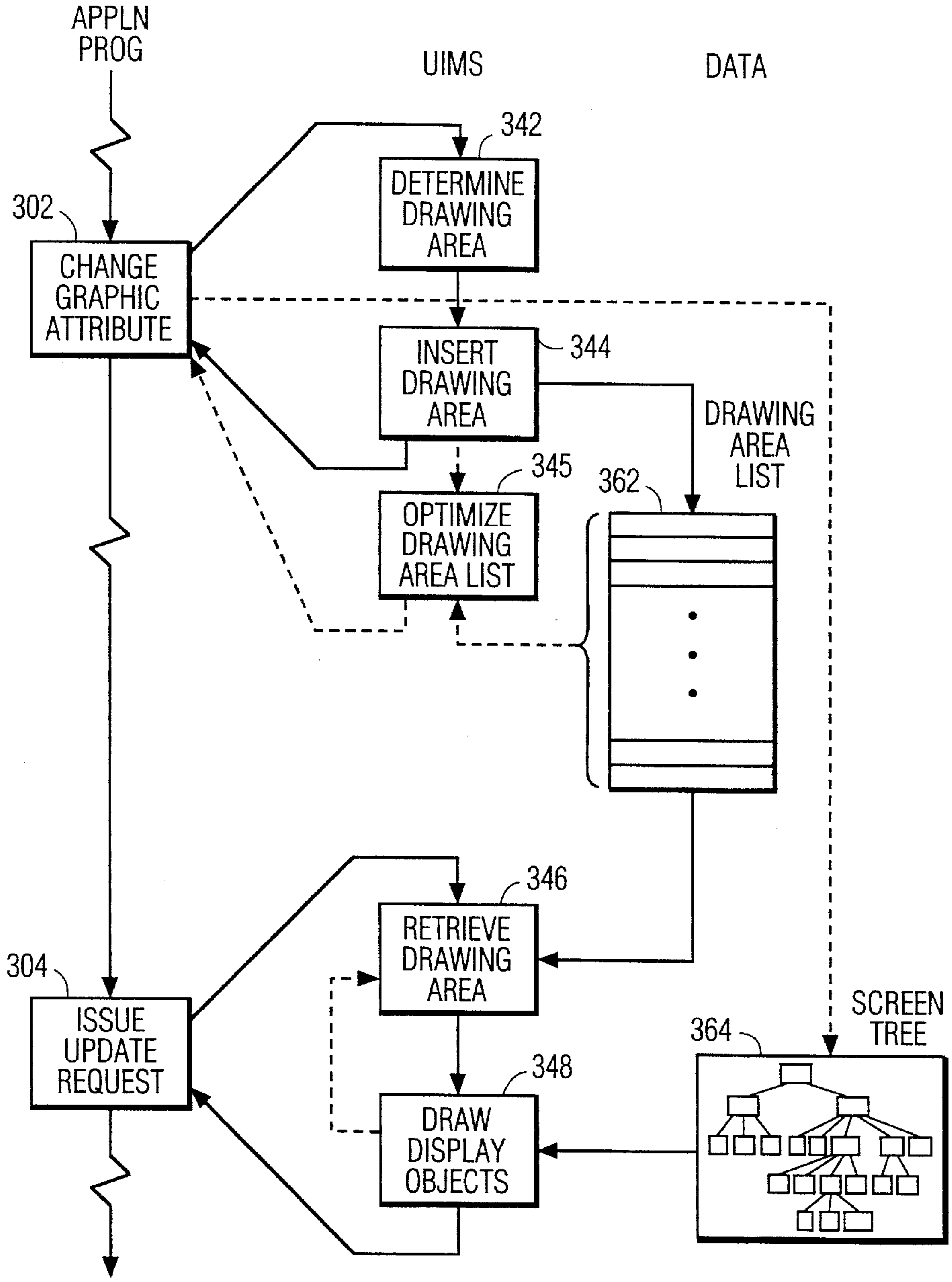
FIG. 1 is a diagram, partially in flow chart form, and partially in memory layout form, illustrating the operation of a processing system incorporating the present invention.
Figure 2:
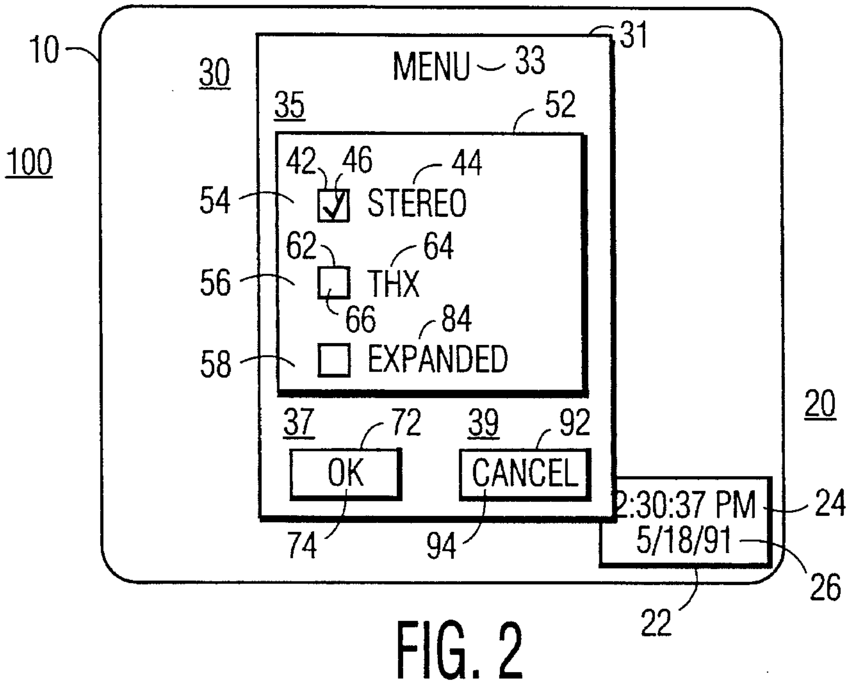
FIG. 2 is a diagram illustrating a display device displaying an image made up of graphic objects.
Figure 3:
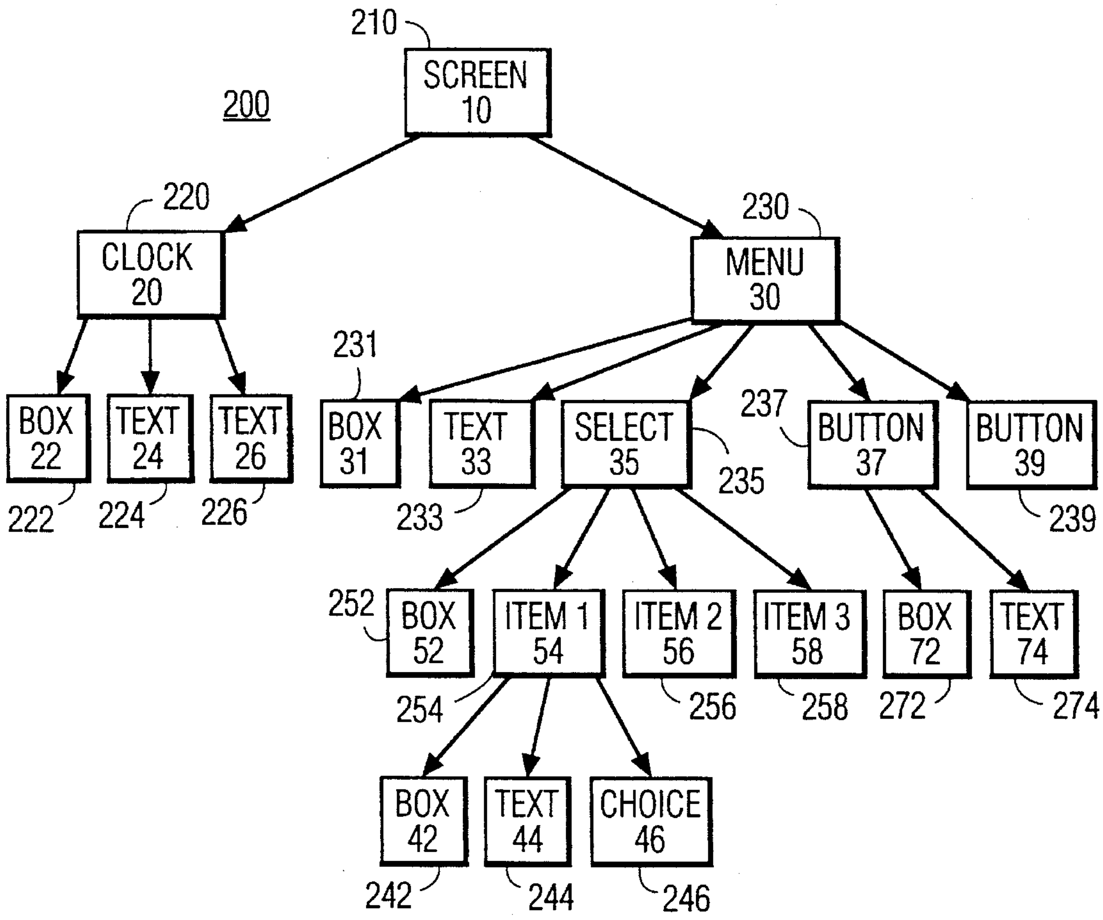
FIG. 3 is a tree diagram corresponding to the graphic objects illustrated in FIG. 2.

FIG. 1 is a diagram, partially in flow chart form, and partially in memory layout form, illustrating the operation of a processing system incorporating the present invention. FIG. 2 is a diagram illustrating a display device 100 displaying graphic objects (10–74) and FIG. 3 is a tree diagram 200 corresponding to the graphic objects (10–74) illustrated in FIG. 2, both of which are useful in understanding FIG. 1. In FIG. 1, a portion of the application program is illustrated in the left-hand column, entitled "APPLN PROG" and a portion of the user interface management system (UIMS) is illustrated in the next column to the right, entitled "UIMS". The right-hand side of the figure, entitled "DATA" illustrates a portion of the data structures maintained by the UIMS.

In FIG. 2, the display device 100 illustrates a display of one screen object 10 in an application program. Screen object 10 includes a menu object 30 partially overlaying a clock object 20. The menu object 30 contains a surrounding box object 31, a title object 33, a selection object 35, an OK button object 37 and a CANCEL button object 39. The title object 33 is a text object with a 'string' attribute having the value "MENU." The selection object 35 contains a surrounding box object 52, and three selection item objects 54, 56 and 58. Selection item object 54 further contains a selection box object 42, a text object 44 with a 'string' attribute having the value "STEREO" and a choice object 46 with a 'selected' attribute having the value TRUE, which is displayed as a check mark inside the selection box object 42.

In the selection item object 56, the 'selected' attribute of the choice object 66 has the value FALSE, which is displayed as a blank space in the selection box object 62. The 'string' attribute of the text object 64 has the value "THX." In the selection item object 58, the 'string' attribute of the text object 84 has the value "EXPANDED." All other corresponding objects in the selection item objects 54, 56 and 58 are the same and are not described in detail. The OK button object 37 includes a surrounding box object 72 and a text object 74 with the 'string' attribute having the value "OK." The CANCEL button object 39 includes a surrounding box object 92 and a text object 94 with the 'string' attribute having the value "CANCEL" The clock object 20 contains a surrounding box object 22, a time text object 24 whose 'string' attribute has the character value of the current time, e.g. "2:30:37 PM," and a date text object whose 'string' attribute has the character value of the current date, e.g. "May 18, 1991."

In FIG. 1, the application program, APPLN PROG, in the course of its programing, changes the attribute of a graphic object in block 302. An application program interface (API) is provided to an application programmer, in a known manner, to permit a request for such an attribute change. More specifically, to change an attribute of a graphic object, a system call is made to a subroutine defined in the API which will change the attribute of the graphic object. The called subroutine is part of the UIMS.

In block 342 of the UIMS, a drawing area (or areas) which will need to be redrawn as a result of the attribute change is determined. In the illustrated embodiment, a rectangle which encompasses the graphic object for which an attribute is changed is determined by the UIMS in block 342. For example, if the color attribute of a circle is changed, then a rectangle (or more precisely, a square) encompassing the circle is determined. The square outlines the area of the image which needs to be redrawn as a result of the attribute change. Data representing the position and size of this square is then inserted into a list of drawing areas 362 in block 344.

The data inserted into the drawing area list 362 will be retrieved at a later time for further processing, in a manner to be described in detail below. The drawing area list 362 may be structured as a first-in-first-out (FIFO) buffer, in a known manner. Alternatively, some other form of controlling the order of retrieval of the previously inserted drawing areas, such as a priority scheme, may be used.

The drawing areas in the drawing area list 362 may also be optimized whenever a new drawing area is inserted into the list, as illustrated in phantom in block 345 of FIG. 1. There are two criteria which are used to measure this optimization. First, there should be as few entries in the drawing area list as is practical. Second, no entry in the drawing list should be so large as to take an inordinate amount of processing time to redraw. After data representing the new drawing area is inserted into the drawing area list 362, that new drawing area is respectively compared to each of the drawing areas currently stored in the drawing area list 362 (illustrated in FIG. 1 by an arrow in phantom from the drawing area list 362 to block 345), and the drawing list is optimized based on the comparison. The comparison is based on the relative positions of the two drawing areas.

Figure 4A:
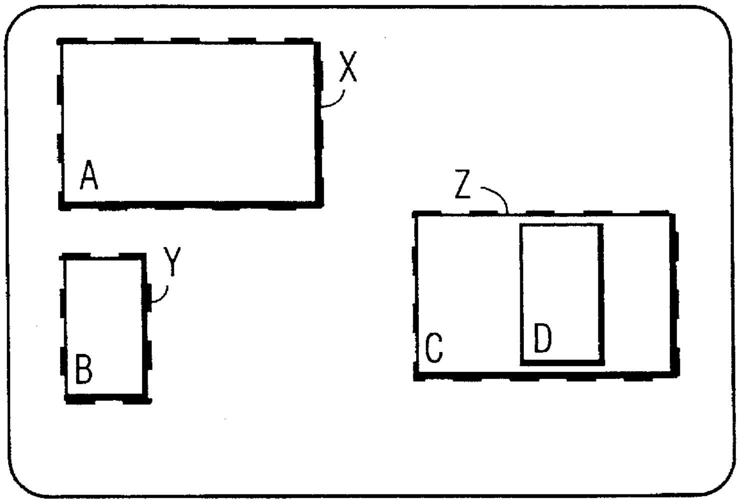

FIG. 4 is a diagram illustrating respective arrangements for optimizing the list of drawing areas. FIG. 4*a* illustrates two possible arrangements of drawing areas. The left-hand side of FIG. 4*a* illustrates a first drawing area A and a second drawing area B which are non-overlapping. In this case, no optimization is possible, and data representing two drawing areas, X and Y are maintained in the list of drawing areas 362. The right-hand side of FIG. 4*a* illustrates a third drawing area C and a fourth drawing area D which completely overlaps the third drawing area C. In this case, data representing only one drawing area, Z, is maintained in the list of drawing areas 362. When drawing area Z is redrawn, it will redraw both drawing areas C and D.

Figure 4B:
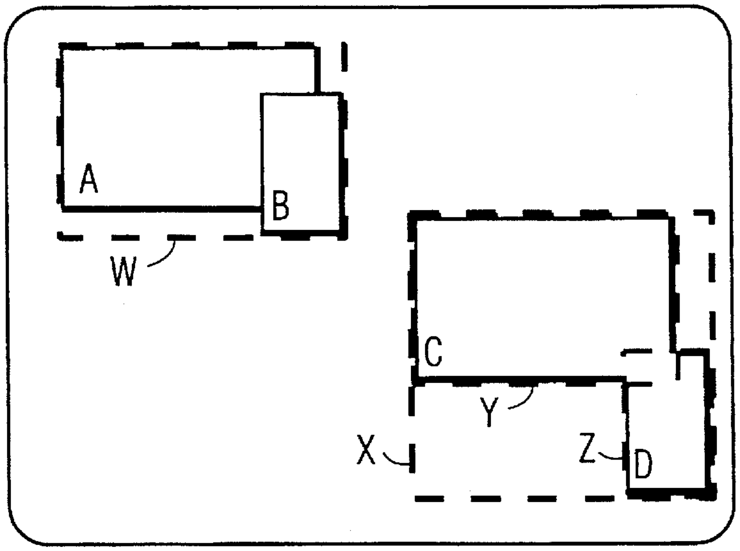

The left-hand side of FIG. 4*b* illustrates a first drawing area A and a second drawing area B which partially overlaps drawing area A, and the right-hand side illustrates a third drawing area C and a fourth drawing area D which partially overlaps drawing area C. When two drawing areas partially overlap, then a proposed drawing area is generated completely surrounding both partially overlapping drawing areas. The area of this newly generated drawing area is compared to the combined areas of the two partially overlapping drawing areas. If the area of the newly generated drawing area is not significantly greater than the sum of the areas of the two partially overlapping drawing areas, then the data representing the two partially overlapping drawing areas is deleted from the list of drawing areas 362, and data representing the newly generated drawing area is inserted into the list of drawing areas 362. Otherwise, the list of drawing areas remains unchanged.

One method for comparing the area of the newly generated drawing area to the sum of the areas of the partially overlapping drawing areas is to subtract the sum of the areas of the partially overlapping drawing areas from the area of the newly generated drawing area, and compare the difference to a fixed threshold. For example, areas of a display screen may be expressed as a number of pixels. In a preferred embodiment, if the difference is less than 1,000 pixels, then data representing the newly generated drawing area replaces the data representing the two partially overlapping drawing areas in the list of drawing areas 362. Alternatively, a ratio of the sum of the areas of the partially overlapping drawing areas to the area of the newly generated drawing area could be compared to a threshold ratio. For example, if the ratio is greater than 0.9, then data representing the newly generated drawing area replaces the data representing the two partially overlapping drawing areas in the list of drawing areas 362.

Referring again to FIG. 4*b*, a drawing area W is newly generated to include the partially overlapping drawing areas A and B. In this case the area of the newly generated drawing area W is not significantly greater than the stun of the areas of the partially overlapping drawing areas A and B. Thus, the data representing the two partially overlapping drawing areas A and B are removed from the list of drawing areas 362, and data representing the drawing area W is inserted into the list of drawing areas 362 in their place. However, the area of the drawing area X, newly generated to include the partially overlapping drawing areas C and D, is significantly greater than the sum of the areas of the partially overlapping drawing areas C and D. Thus, two entries are maintained in the list of drawing areas 362: drawing area Y, surrounding area C, and drawing area Z, surrounding area D.

Figure 4C:
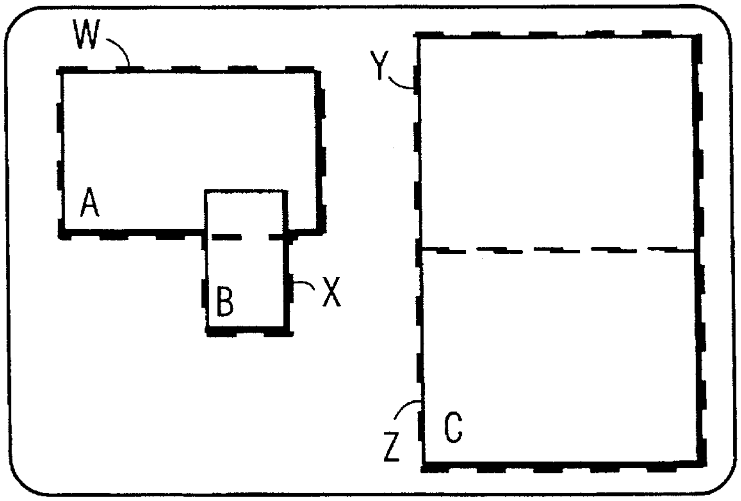

The left-hand side of FIG. 4*c* illustrates a first drawing area A and a second drawing area B which partially overlaps drawing area A, and the right-hand side illustrates a third drawing area C. On the left-hand side of FIG. 4*c*, drawing area B overlaps drawing area A in such a manner that the two areas may be decomposed into two different drawing areas, W and X. The result on the display device of redrawing drawing areas W and X is the same as redrawing drawing areas A and B, but the area thus redrawn is reduced through this decomposition. Therefore, data representing the drawing areas A and B are deleted from the list of drawing areas 362, and are replaced by data representing drawing areas W and X.

When a very large drawing area is inserted into the list of drawing areas, the time necessary to redraw the area is large. In order to provide flexibility in redrawing this area, it is divided into sections. Drawing area C on the right-hand side of FIG. 4c occupies nearly half the area of the display device. Thus, drawing area C is divided into two drawing areas, Y and Z. Data representing the drawing areas Y and Z are inserted into the list of drawing areas 362 in place of data representing drawing area C.

When a new drawing area is generated and inserted into the list of drawing areas 362, the newly generated drawing area may overlap other drawing areas, and thus must be compared to the other drawing areas as described above. When no further optimizations are possible, then the UIMS returns control to the application program, which can continue with other processing. The screen is not redrawn at this point.

Referring again to FIG. 1, after control is returned to the application program from the UIMS subroutine in block 302, further processing by the application program (which need not be related to the attribute change of the graphic object) is performed, illustrated in FIG. 1 by a zig-zag line descending from block 302. At a later time, in block 304, the application program makes a system call to a UIMS subroutine, defined in the API, which will update the screen.

In response to this system call, the UIMS, in block 346, retrieves data representing a previously stored drawing area from the list of drawing areas 362 in a FIFO (or alternative) manner, as described above. This retrieved drawing area is used as a boundary box in a manner described below. In block 348, each graphic object currently displayed on the screen is sent a message to redraw itself.

Data representing the currently displayed graphic objects are stored in a data tree structure 364, containing a node for each graphic object. This tree is traversed in a manner described below and a redraw message sent to each graphic object, thus, traversed. The graphic objects respond to this message by executing one of the methods associated with this graphic object: REDRAW. The REDRAW method first determines if any portion of the graphic object lies within the boundary box. If so, then that graphic object calls low-level graphic display routines which will redraw that graphic object. Otherwise, nothing is done. When each currently displayed graphic object has executed its REDRAW method, the retrieved drawing area will have been completely redrawn.

FIG. 3 illustrates the data tree structure 200 representing the image on the display device 100 of FIG. 2. Each node in the tree 200 represents a graphic object. Children nodes represent graphic objects contained in the parent object. Referring to FIG. 3, the top node 210, which is commonly referred to as the root node of the tree, represents the screen object 10. As described above, the screen object 10 contains a clock object 20 and a menu object 30. Root node 210 correspondingly has a first child node 220, representing the clock object 20, and a second child node 230, representing the menu object 30. Regarding the children nodes of the clock node 220, node 222 represents the surrounding box object 22, node 224 represents the time text object 24 and node 226 represents the date text object 26.

Regarding the children nodes of the menu node 230, node 231 represents the surrounding box object 31, node 233 represents the title text object 33, node 235 represents the selection object 35, node 237 represents the OK button object 37 and node 239 represents the CANCEL button object 39. Regarding the children nodes of the selection node 235, node 252 represents the sur- rounding box object 52 and nodes 254–258 represent the three selection item objects 54–58, respectively. In order to simplify the figure, only children nodes from a representative selection item node (254) and button node (37) are illustrated in FIG. 3. All selection item nodes and both button nodes have similar children node structures. Regarding the children nodes of selection item node 254, node 242 represents the selection box object 42, text node 244 represents the text object 44 and choice node 246 represents the choice object 46. Regarding the children nodes of the OK button node 237, node 272 represents the surrounding box object 72 and node 274 represents the text object 74.

When an image is drawn or redrawn, the tree structure representing that image is traversed recursively in order from left to right starting at the root node and a redraw message is sent to the object represented by each node as it is traversed. The REDRAW method for an object first determines if any portion of graphic image representing that object lies within the boundary box (from box 346 of FIG. 1). If so, the REDRAW method calls the low level graphic routines which draw the object represented by that node on the display screen according to the attributes of that graphic object.

For example, to draw a box object, low level graphic routines are called which will draw a box at the position specified by the position attribute of the box object, having the size specified in the size attribute, and the color specified in the color attribute. Other attributes, e.g. line thickness, shadow thickness, etc., may also be part of the box object, and will affect the drawing of the surrounding box image. As another example, to draw a text object, low level graphic routines are called which will draw the image of the characters in the string attribute at the position specified in the position attribute having the size specified in the size attribute. Other attributes which may be present in the text object are font, text attributes (bold, italic etc.) text color, background color, etc. All other graphic objects are similarly drawn according to their attributes.

For a node containing children nodes (i.e. a parent node), the REDRAW method then sends a redraw message to all children of that node. First, a redraw message is sent to the left-most child node. The REDRAW method of the parent node waits for a return message from the child node indicating that redrawing is complete, then it continues with sibling nodes from left to right until redraw messages have been sent to, and redraw complete messages received from, all the children. A message is then sent to its own parent node indicating that redrawing is complete and the REDRAW method of that object terminates. The REDRAW methods of all the graphic objects may refer to the tree structure 364 (of FIG. 1), as illustrated by the arrow from the tree structure 364 to block 348.

Refer now to the image illustrated in FIG. 2 and represented by the tree structure illustrated in FIG. 3. At the last preceding clock tick, i.e. at exactly 2:30:37 PM, the 'string' attribute of the time text object 24 of the clock object 20 was changed from "2:30:36 PM" to "2:30:37 PM." At that time, data representing a rectangle (not shown) surrounding the time text object 24 was inserted into the drawing area list 362 by block 344 of the UIMS (of FIG. 1). When the data representing that rectangle is retrieved from the drawing area list 362 by block 346 of the UIMS, the image is redrawn in the following manner.

As described above, the rectangle represented by the retrieved data is used as the boundary box. Then, block 348 of the UIMS (of FIG. 1) sends a redraw message to the screen object 10 represented by the root node 210. The REDRAW method of the screen object 10 first determines from its graphic attributes if any portion lies within the boundary box. In this case, it does not, so no low level graphic routines are called. The REDRAW method of the screen object 10 then sends a redraw message to the clock object 20 represented by the left-hand node 220 of the root node 210, and waits for a message indicating that the clock object 20 has completed redrawing itself.

The REDRAW method of the clock object 20 first sends a redraw message to the surrounding box object 22 represented by node 222, and waits for a redraw complete message. The REDRAW method of the surrounding box object 22 first determines from its position and size attributes whether any portion of the surrounding box 22 lies within the boundary box. In this case, again, it does not, so a message indicating that the redrawing is complete is sent back to the REDRAW method of clock object 20, and the REDRAW method of the surrounding box object 22 terminates.

When the REDRAW method of the clock object 20 receives the redraw complete from the REDRAW method of the surrounding box object 22, it then sends a redraw message to the time text object 24, represented by node 224, and waits for a redraw complete message. The REDRAW method of the time text object 24 first determines if any portion of the text lies within the boundary box. Because the time text object 24 does lie within the boundary box, low level routines are called to draw the time text object, according to its attributes. I.e. the characters representing the new time are drawn on the image. Then a redraw complete message is returned to the clock object 20, and the REDRAW method terminates. The clock object 20 then sends a redraw message to the date text object 26, which operates similarly to the time text object 24. In this case, no redrawing is done and the REDRAW method returns a redraw complete message to the clock object 20. When the redraw complete message from the date text object 26 has been received by the clock object 20, its REDRAW method is complete. It sends a message back to the screen object 10 so indicating, and its REDRAW method terminates.

When the screen object 10 receives this message from the clock object 20, it sends a redraw message to the menu object 30. The REDRAW method of the menu object 30 in turn sends a redraw message to the surrounding box object 31, and waits for a redraw complete message from the surrounding box object 31. The lower right-hand corner of the surrounding box object 31 lies within the boundary box, so it is redrawn (i.e. low level graphic routines are called). Then a redraw complete message is returned to the menu object 30. When this redraw complete message is received, the same procedure is repeated for the title text object 33, the selection object 35, the OK button 37 and the CANCEL button 39, in that order. Each of those objects operates recursively in the manner described in detail above, and the screen is, thus, redrawn. In this case, only the surrounding box object 94 of the CANCEL button 39 lies within the boundary box and is redrawn.

As described above, the clock object 20 is drawn before the menu object 30, thus, it is overlaid by the menu object 30, and seems to lie beneath the menu object 30 on the display device 100. In general the object represented by the right-most node in the tree appears on the top of the displayed image, and the object represented by the left-most node appears on the bottom of the displayed image. This is referred to as the Z order. It is possible that a change in an attribute will change the Z order position of an object, and the screen tree will need to be changed. More specifically, when an object is placed 'on top' in the Z order, that object is made the right-most sibling of its parent object, with all the other sibling objects remaining in their same relative positions. Referring to FIG. 1, this is represented by a dashed line from block 302 to block 364. This is a schematic linkage only, however. A routine in the UIMS, performed during the API change-attribute call, will actually update the tree diagram 364.

Referring to FIG. 5, it is also possible that two drawing areas will be generated as a result of a single attribute change. For example, if the position attribute of a graphic object is changed, i.e. the graphic object is moved from one place to another, then a first rectangle encompassing the object at its old position and a second rectangle encompassing the object at its new position will be generated, and data related to both stored in the drawing area list 362 (of FIG. 1). In FIG. 5, the clock object 20 is to be moved. In FIG. 5*a*, the first rectangle, OLD, illustrated by a thick dashed rectangle in the lower right-hand corner of the screen 10 encompasses the clock object 20 at its old position. The second rectangle, NEW, illustrated as a thick dashed rectangle in the upper center portion of the screen 10 encompasses the area of the screen 10 which will be occupied by the clock object 20 at its new position. The movement is illustrated by a thick dashed arrow from the old position OLD to the new position NEW. All of the thick dashed lines are for illustrative purposes only, no such lines are displayed on the display device 100. Data representing the position and size of the two rectangles, OLD and NEW, are stored in the drawing area list 362 (of FIG. 1). But, as described above, the display is not redrawn at this point. Instead, the display device 100 continues to display the screen 10 illustrated in FIG. 2.

Referring again to FIG. 5, the clock object 20 is not only moved, but will now appear on top of the menu object 30. The tree structure of FIG. 3, thus, is changed so that the clock node 220 now is the right-most child node of the root node 210, and the menu node 230 is the left-most node. The new tree structure is illustrated in FIG. 6. In FIG. 6 the only difference from FIG. 3 is that the menu node 230 is now the left-hand child node of the root node 210 and the clock node 220 is the right-hand child node of the root node 210. As described above, this will result in the clock object 20 being displayed atop the menu object 30 as the image is redrawn by traversing this tree.

FIG. 5*b* illustrates the image resulting after both the OLD and NEW rectangle drawing areas have been redrawn as described above by traversing the tree structure illustrated in FIG. 6. Referring first to redrawing the OLD rectangle. The screen background lies within the OLD rectangle, so it is redrawn (i.e. low level graphic routines are called) by the REDRAW method for the screen object 10, as described above. Then a redraw message is sent to the menu object 30. In the menu object 30, the surrounding box object 31 of the menu object 30, and the surrounding box object 94 of the CANCEL button object 39 both lie within the OLD rectangle, so they are redrawn by their REDRAW methods. Because no other graphic object in the menu object 30 lies within the OLD rectangle, no further graphic objects are redrawn.

Referring now to redrawing the NEW rectangle. The screen background lies within the NEW rectangle, so it is redrawn by the REDRAW method of the screen object 10. Then a redraw message is sent to the menu object 30. The surrounding box object 31 of the menu object 30, the surrounding box object 52 of the selection object 35 and the text object 44 of the first selection item object 54 all lie within the NEW rectangle, so they are all redrawn by their respective REDRAW methods. Then a redraw message is sent to the clock object 20. Every graphic object in the clock object 20 lies within the NEW rectangle, so they are all redrawn by their respective REDRAW methods. Because the graphic objects of the clock object 20 are drawn last, they are drawn atop the other graphic objects (screen object 10 and menu object 20), and the clock object 20 appears to overlay them. The resulting image from the change in the position attribute of the clock object 20, and the subsequent, asynchronous redrawing of the OLD and NEW rectangles is illustrated in FIG. 5*c*.

Referring again to FIG. 1, in block 304, the application program may request that a single drawing area be redrawn. In response to such a request, in block 346 of the UIMS, the next drawing area is retrieved from the drawing area list 362, and in block 348, that drawing area is redrawn by traversing the tree structure from block 364 as described above. When the redrawing is complete, the UIMS returns to the application program which may perform further processing, illustrated as an arrow descending from block 304.

Alternatively, the application program may request that the complete image be redrawn. In response to such a request, in block 346 of the UIMS, the next drawing area is retrieved from the drawing area list 362, and in block 348, that drawing area is redrawn by traversing the tree structure from block 364 as described above. Then a check is made to determine if any other drawing areas remain in the drawing area list 362. If so, then the processing represented by blocks 346 and 348 is repeated, illustrated in phantom in FIG. 1 by an arrow from block 348 back to block 346. Only when all of the drawing areas in the drawing area list 362 have been redrawn does the UIMS return to the application program which may then perform further processing, illustrated as an arrow descending from block 304.

By allowing the application program to control the timing of the redrawing of the screen in response to changes in attributes of graphic objects, the application programmer may optimize the perceived response of the application program. If, for example, the perceived response of the application program will be optimized by receiving and processing inputs from a user, then the application program may be in the form of a loop which repeatedly receives and processes an input from the user, and then updates one drawing area of the screen. If the perceived response of the application program will be optimized by maintaining the screen as quickly as possible, then the application program may be in the form of always requesting a complete screen update after any change in an attribute of a graphic object. In short, by making screen updates asynchronous from graphic object attribute changes, and by placing the screen updates under the control of the application program, and by giving the application program the option of updating only a portion of the screen, or the complete screen, an application programmer may write the application program to optimize the perceived response of the application program.

What is claimed is:

1. In a processing system executing an application program displaying a plurality of graphic objects, a method for asynchronously maintaining an image on a display device, comprising the steps of:

receiving a drawing request from the application program;

determining a drawing area of the image in response to the received drawing request;

inserting a new entry representing the drawing area into a list of a plurality of entries each representing respective drawing areas;

receiving an image update request from the application program;

retrieving one of the plurality of entries representing drawing areas from the list; and requesting that respective graphic objects be redrawn if any portion of the graphic object lies within the drawing area represented by the retrieved entry.

2. The method of claim 1 wherein the step of inserting the new entry into the list comprises the steps of:

comparing the drawing area represented by the new entry to the respective drawing areas represented by the plurality of entries in the list; and optimizing the list on the basis of the results of the comparing step.

3. The method of claim 2, wherein:

the comparing step comprises the step of determining if the drawing area represented by the new entry lies completely within the drawing area represented by another entry in the list; and if the drawing area represented by the new entry lies completely within the drawing area represented by the other entry in the list, the optimizing step comprises the step of deleting the new entry.

4. The method of claim 2, wherein:

the comparing step comprises the step of determining if the drawing area represented by the new entry completely encompasses the drawing area represented by another entry in the list; and if the drawing area represented by the new entry completely encompasses the drawing area represented by the other entry, the optimizing step comprises the step of deleting the the other entry.

5. The method of claim 1 wherein:

the step of receiving a drawing request comprises the step of receiving a request to draw a graphic object on the image; and the step of determining a drawing area comprises the step of determining the position and size of a rectangle which will encompass an area of the image at which the graphic object will be drawn.

6. The method of claim 5 wherein the step of inserting an entry representing the drawing area into the list comprises the step of inserting the position and size of the rectangle into the entry in the list.

7. The method of claim 1 wherein:

the step of receiving a drawing request comprises the step of receiving a request to move a graphic object on the image; and the step of determining a drawing area comprises the steps of:

determining the position and size of a first rectangle which will encompass an area of the image at which the graphic object was originally displayed; and determining the position and size of a second rectangle which will encompass an area of the image at which the graphic object will be displayed.

8. The method of claim 7 wherein the step of inserting the entry representing the drawing area into the list comprises the step of inserting the respective positions and sizes of the first and second rectangles into respective corresponding entries in the list.

9. The method of claim 1 further comprising the step of maintaining the list of entries representing respective drawing areas as a first-in-first-out list.

10. The method of claim 1 further comprising the step of maintaining the list of entries representing respective drawing areas using a priority scheme.

11. The method of claim 1 further comprising the step of:

maintaining a tree structure having a plurality of nodes each corresponding to a respective one of the plurality of graphic objects; wherein:

the step of requesting that respective graphic objects be redrawn comprises the steps of:

traversing each node the tree structure; and requesting that the graphic object corresponding to the currently traversed node of the tree structure be redrawn if any portion of the graphic object lies within the drawing area represented by the retrieved entry.

12. The method of claim 11, wherein the step of requesting that the graphic object corresponding to the currently traversed node of the tree structure be redrawn comprises the steps of:

determining if any portion of the graphic object corresponding to the currently traversed node lies within the drawing area represented by the retrieved entry;

redrawing the graphic object if any portion lies within the drawing area represented by the retrieved entry; and returning a message to the parent node indicating that the redrawing is complete.

13. The method of claim 11, wherein the step of traversing each node in the tree structure comprises the steps of:

starting with a root node; and recursively traversing children nodes, in order from a left-most child node to a right-most child node.

14. The method of claim 13, wherein the step of requesting that the graphic object corresponding to the currently traversed node of the tree structure be redrawn comprises the steps of:

determining if any portion of the graphic object corresponding to the currently traversed node lies within the drawing area of the retrieved entry;

redrawing the graphic object if some portion lies within the drawing area represented by the retrieved entry;

traversing children nodes, in order from a left-most child node to a right-most child node, if the currently traversed node has children nodes; and returning a message to the parent node indicating that the redrawing is complete.

15. The method of claim 14, wherein the step of traversing children nodes further comprises the steps of:

traversing a child node; and waiting for the message indicating that the redrawing is complete from the child node.

16. The method of claim 1 wherein:

the step of receiving a screen update request comprises the step of receiving a request for update the complete image; and the method further comprises the step of repeating the retrieving and requesting steps in response to the received complete image update request.

* * * * *